(12) United States Patent
Dabak et al.

(10) Patent No.: US 9,531,547 B2
(45) Date of Patent: Dec. 27, 2016

(54) HOST-BASED DIGITAL SIGNATURE VERIFICATION FOR GUEST COMPONENTS

(71) Applicant: VMWARE, INC., Palo Alto, CA (US)

(72) Inventors: Prasad Dabak, Pune (IN); Alok Nemchand Kataria, Pune (IN)

(73) Assignee: VMware, Inc., Palo Alto, CA (US)

( * ) Notice: Subject to any disclaimer, the term of this patent is extended or adjusted under 35 U.S.C. 154(b) by 7 days.

(21) Appl. No.: 14/749,684

(22) Filed: Jun. 25, 2015

(65) Prior Publication Data
US 2016/0294559 A1   Oct. 6, 2016

(30) Foreign Application Priority Data

Apr. 6, 2015  (IN) .......................... 1810/CHE/2015

(51) Int. Cl.
| | | |
|---|---|---|
| *G06F 21/60* | (2013.01) | |
| *H04L 9/32* | (2006.01) | |
| *G06F 9/455* | (2006.01) | |

(52) U.S. Cl.
CPC ......... *H04L 9/3247* (2013.01); *G06F 9/45558* (2013.01); *G06F 21/602* (2013.01); *G06F 2009/45587* (2013.01); *H04L 2209/24* (2013.01); *H04L 2209/72* (2013.01)

(58) Field of Classification Search
CPC ......... G06F 21/602; G06F 21/10; H04L 63/06
USPC ................................................. 713/189, 176
See application file for complete search history.

(56) References Cited

U.S. PATENT DOCUMENTS

| | | | | |
|---|---|---|---|---|
| 5,027,396 A | * | 6/1991 | Platteter | G11B 20/00086 355/133 |
| 5,166,886 A | * | 11/1992 | Molnar | G06F 21/10 380/251 |
| 5,327,563 A | * | 7/1994 | Singh | G06F 21/121 705/51 |
| 7,124,302 B2 | * | 10/2006 | Ginter | G06F 21/10 380/279 |
| 7,302,588 B2 | * | 11/2007 | Sako | G11B 19/12 380/201 |
| 7,327,843 B2 | * | 2/2008 | Yoshida | G11B 23/281 369/275.3 |
| 7,475,260 B2 | * | 1/2009 | Curtis | G06Q 20/389 713/189 |
| 7,492,895 B2 | * | 2/2009 | Senshu | G11B 19/04 380/200 |
| 7,721,338 B2 | * | 5/2010 | Reckless | G11B 20/00086 713/182 |
| 7,917,958 B2 | * | 3/2011 | Suh | G11B 7/0053 713/189 |
| 8,229,857 B2 | * | 7/2012 | Diehl | G11B 20/00086 380/259 |

(Continued)

*Primary Examiner* — Haresh N Patel

(57) ABSTRACT

Examples perform external verification of authenticity of software components loaded onto virtual machines (VM). A processor, external to the VM, reads the loaded software component from the VM, and restores the loaded software component to its disk image state by undoing any changes made to load the software component. The digital signature is read from the restored disk image of the software and compared to the verified digital signature of the publisher of the software component. Some examples contemplate marking the software component as verified or unverified, and preventing unverified software components from making global changes.

20 Claims, 11 Drawing Sheets

(56) References Cited

U.S. PATENT DOCUMENTS

| | | | | | |
|---|---|---|---|---|---|
| 8,549,323 | B2* | 10/2013 | Ueda | | G06F 21/10 |
| | | | | | 713/189 |
| 8,549,620 | B2* | 10/2013 | Ueda | | G06F 21/10 |
| | | | | | 705/51 |
| 8,649,513 | B2* | 2/2014 | Holzapfel | | G11B 20/00086 |
| | | | | | 380/201 |
| 2007/0088957 | A1* | 4/2007 | Carson | | G06F 21/64 |
| | | | | | 713/176 |
| 2007/0226807 | A1* | 9/2007 | Ginter | | G06F 21/10 |
| | | | | | 726/27 |
| 2008/0141038 | A1* | 6/2008 | Okamoto | | G11B 20/00086 |
| | | | | | 713/189 |
| 2008/0320314 | A1* | 12/2008 | Eckleder | | G06F 11/1076 |
| | | | | | 713/189 |
| 2008/0320316 | A1* | 12/2008 | Waldspurger | | H04L 63/083 |
| | | | | | 713/189 |
| 2010/0205421 | A1* | 8/2010 | Campbell | | G06F 11/1417 |
| | | | | | 713/2 |
| 2011/0023126 | A1* | 1/2011 | Hayami | | G06F 21/10 |
| | | | | | 726/26 |
| 2012/0260105 | A1* | 10/2012 | Smith | | G06F 21/14 |
| | | | | | 713/190 |
| 2012/0272070 | A1* | 10/2012 | Ueda | | G11B 20/00086 |
| | | | | | 713/189 |
| 2013/0268770 | A1* | 10/2013 | Hunt | | G06F 17/3033 |
| | | | | | 713/189 |
| 2013/0290737 | A1* | 10/2013 | Shuster | | H04L 9/0894 |
| | | | | | 713/189 |
| 2016/0057006 | A1* | 2/2016 | Thakkar | | G06F 9/45558 |
| | | | | | 709/222 |

* cited by examiner

US 9,531,547 B2

HOST-BASED DIGITAL SIGNATURE VERIFICATION FOR GUEST COMPONENTS

RELATED APPLICATIONS

Benefit is claimed under 35 U.S.C. 119(a)-(d) to Foreign application Serial No. 1810/CHE/2015 filed in India entitled "HOST-BASED DIGITAL SIGNATURE VERIFICATION FOR GUEST COMPONENTS", on Apr. 6, 2015, by VMware, Inc., which is herein incorporated in its entirety by reference for all purposes.

BACKGROUND

Verifying digital signatures of software components ensures the authenticity and integrity of the software component. Some commercial operating systems include built-in support for verifying the digital signature of software components. Unfortunately, this verification support is not always enabled in those operating systems, and it can also be explicitly disabled on a compromised operating system.

Usually, verification of digital signature occurs internally, when a guest operating system operating on a virtual machine (VM) verifies the software component which the guest operating system has loaded, in a form of self-verification by the guest operating system. However, this method of self-verification is susceptible to tampering. In some examples, a disk copy of the software component is tampered with and the operating system digital signature verification system may be disabled. In another example, the guest operating system's digital signature verification happens; however, the loaded copy is tampered with after the guest operating system's signature verification is complete. Such compromises to the security of the digital signature would be undetectable.

BRIEF DESCRIPTION OF THE DRAWINGS

Corresponding reference characters indicate corresponding parts throughout the drawings.

DETAILED DESCRIPTION

Figure 1:
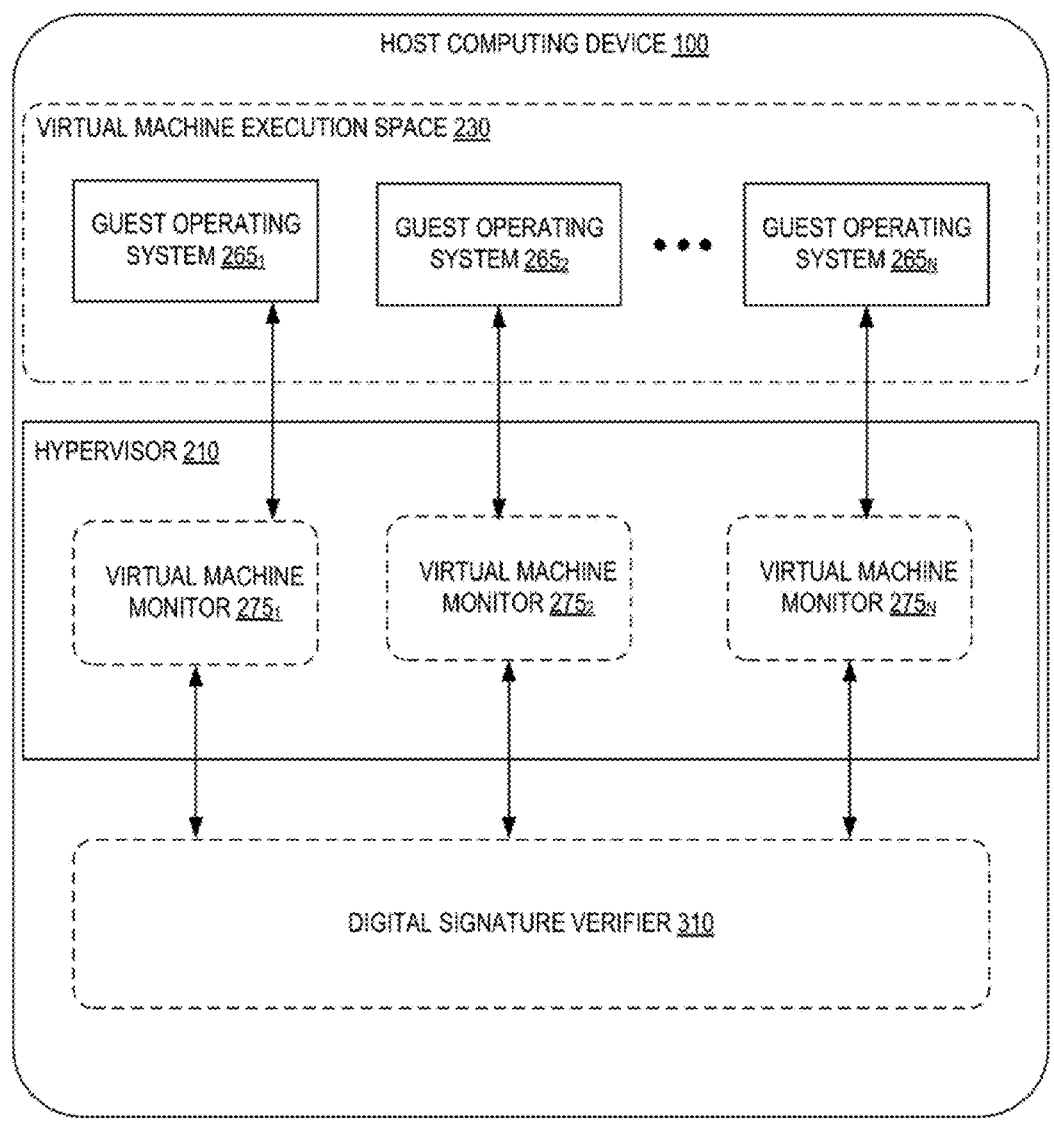
FIG. 1 is a block diagram of an exemplary computing device for externally verifying the digital signature of software components loaded on guest operating systems (GOS).

The disclosure provides examples of techniques for verifying that software components loaded by a guest operating system on a virtual machine (VM) are valid. Some virtual machines load software components which may be corrupted, unverified, or otherwise compromised. The disclosure provides examples of verification of loaded software components, by an element external to the virtual machine or guest operating system loading the software component. In some examples, a software component is valid if has not been altered since leaving the publisher.

While various guest operating systems have built-in verification systems, those systems are susceptible to corruption and to errors created when the verification systems are disabled. The verification system described herein shifts the verification to the host or hypervisor, which operate external to the guest operating system. For example, aspects of the disclosure enable the host or hypervisor to confirm that the digital signature of a software component is authentic. As part of the signing process, when a software component is created it is digitally signed by its publisher. The digital signature of a program is created by taking a hash (also known as a message digest) of the program binary bits, and then encrypting this hash with a private key of the publisher of the software component. The private key is only known to the publisher. Corresponding to the private key there is a public key that is self-contained in the executable itself. The encrypted hash, which can be decrypted using the public key, is stored in the signature block itself. Once decrypted, the hash is used to verify if the sender is the one that is expected.

In one example, after a portable executable is generated a publisher uses signing tools, such as signtol.exe, to sign the portable executable (PE). As part of the signing process, a digital signature is generated and appended to the end of the PE and one of the section headers in the PE format points to the location of the signature. In the present example the signature is a standard PKCS7 SignedData structure. The PKCS #7 SignedData structure contains the PE file's hash value, a signature created by the software publisher's private key, and the certificates that bind the software publisher's signing key to a legal entity.

Aspects of the disclosure enable a virtual machine manager (VMM) to read the loaded copy of the software component. The VMM provides the loaded copy of the software component to a digital signature verifier which converts the loaded software component to its disk copy state. The digital signature verifier calculates, discovers, or otherwise obtains the digital signature of the software component from the version of the software component in its disk state. In examples in which the signature is part of the executable, the signature verifier does not need anything beyond the loaded software component and signature block to perform the verification. Subsequently, the digital signature verifier uses a public key to decrypt the digital signature of the software component, to verify that the hash associated with the software component matches that of the publisher of the software component. The digital signature is, in some examples, part of the executable of the software component. The verification of the digital signature typically involves computing the hash of the executable and matching it with the encrypted hash stored in the signature. The encrypted hash is decrypted using the public key of the publisher which is also stored as part of the signature. In some example, the digital signature verifier informs an external policy framework of the outcome of the comparison which decides what to do when the verification fails. Alternatively or in addition, the digital signature verifier notifies the guest operating system of the outcome of the comparison.

External verification of the integrity of the software component by the host or hypervisor is more reliable than internal verification by the VM or the guest operating system because the host or hypervisor does not rely on information or processes located on the guest operating system, other than the loaded software component, to verify the software component. Consequently, the methods of verifying software components described in this document are more reliable, less prone to tampering, and not as easy to disable, in contrast to verification systems which operate internally on the VM. With verification systems that operate internal to the VM, it is difficult to ensure that those systems have not been compromised. In some examples, the software component is not loaded on a VM, but rather is loaded on a container or other type of data compute node.

FIG. 1 is a block diagram of an exemplary computing device for verifying, external to the VM, the digital signature of software components loaded on a guest operating systems (GOS). FIG. 1 highlights the elements of the system in FIG. 2 that are involved in the external verification of the digital signature of the software components. The host computing device 100 contains, in this illustration, a virtual machine execution space 230. On the virtual machine execution space are located a plurality of VMs 235 (not illustrated) which are running a plurality of guest operating systems 265. Each guest operating system 265 communicates with a virtual machine monitor (VMM) 275, located on the hypervisor 210, externally to the virtual machine execution space 230. Each VMM 275 communicates with a shared digital signature verifier 310. In the example of FIG. 1, the digital signature verifier 310 is located on the host computing device 100, but it is not located on the hypervisor 210. In other examples, the digital signature verifier 310 is located on, or otherwise executed by, the hypervisor 210.

Figure 2:
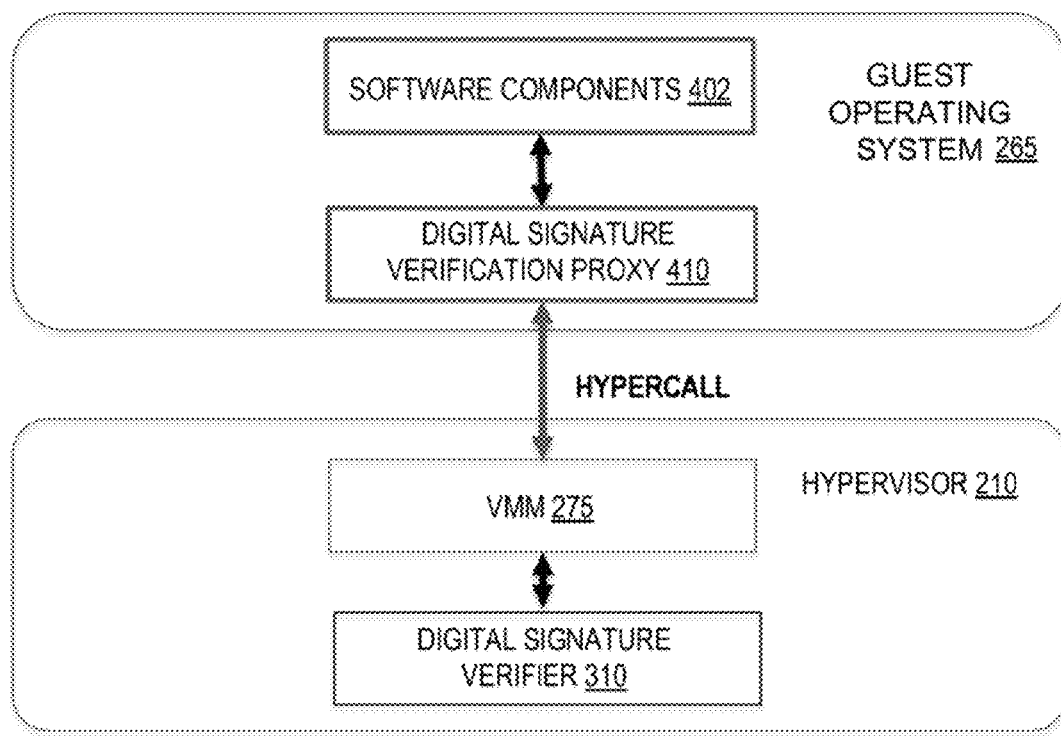
FIG. 2 is a block diagram of an example of a guest operating system making a hypercall to a hypervisor requesting verification of a software component.

FIG. 2 is a block diagram of an example of a guest operating system making a hypercall to a hypervisor 210 requesting verification of a software component (SC) 402. In the context of this document, a hypercall is a software trap from a VM to the hypervisor, just as a syscall is a software trap from an application to the kernel. Although described in connection with hypercall, examples of the disclosure are operative with numerous other mechanisms for communicating between the VM 235 and the hypervisor 210. In another example, the VM 235 and the hypervisor 210 communicate through the Virtual Machine Communication interface (VMCI), by VMware, Inc.

In this example, the guest operating system 265 has loaded SC 402. The software component is unverified. In some examples all newly loaded SCs 402 are automatically marked as unverified. If SC 402 is unverified, in this example, it is unknown whether SC 402 has been tampered with, or whether the origin of SC 402, in some examples the publisher, is legitimate. The digital signature verification proxy 410, operating on the guest operating system 265, notifies the VMM 275 that SC 402 has been loaded on the guest operating system 265. This notification may occur via a hypercall to the VMM 275. The hypercall includes, in some examples, information about the argument block linear address of the loaded software component, and the length of that argument block linear address. The argument block carries, in some examples, meta information about the SC 402. The meta information includes, in some examples, the start and length of the loaded SC 402, the start and length of the digital signature of the SC 402, and any other information that may be required by the digital signature verifier 310.

The VMM 275, located on the hypervisor 210, responds to the notification of a newly loaded SC 402 by initiating verification of SC 402 through the digital signature verifier 310, also located in this example on the hypervisor. The digital signature verifier 310 utilizes the information provided in the hypercall to read the argument block. Subsequently, the information in the argument block is used to read the data the argument block points to. The VMM 275 and the digital signature verifier 310 communicate through an API. In some examples, such as in FIG. 1, the digital signature verifier 310 is located on the host computing device 100 separately from the hypervisor 210.

Figure 3:
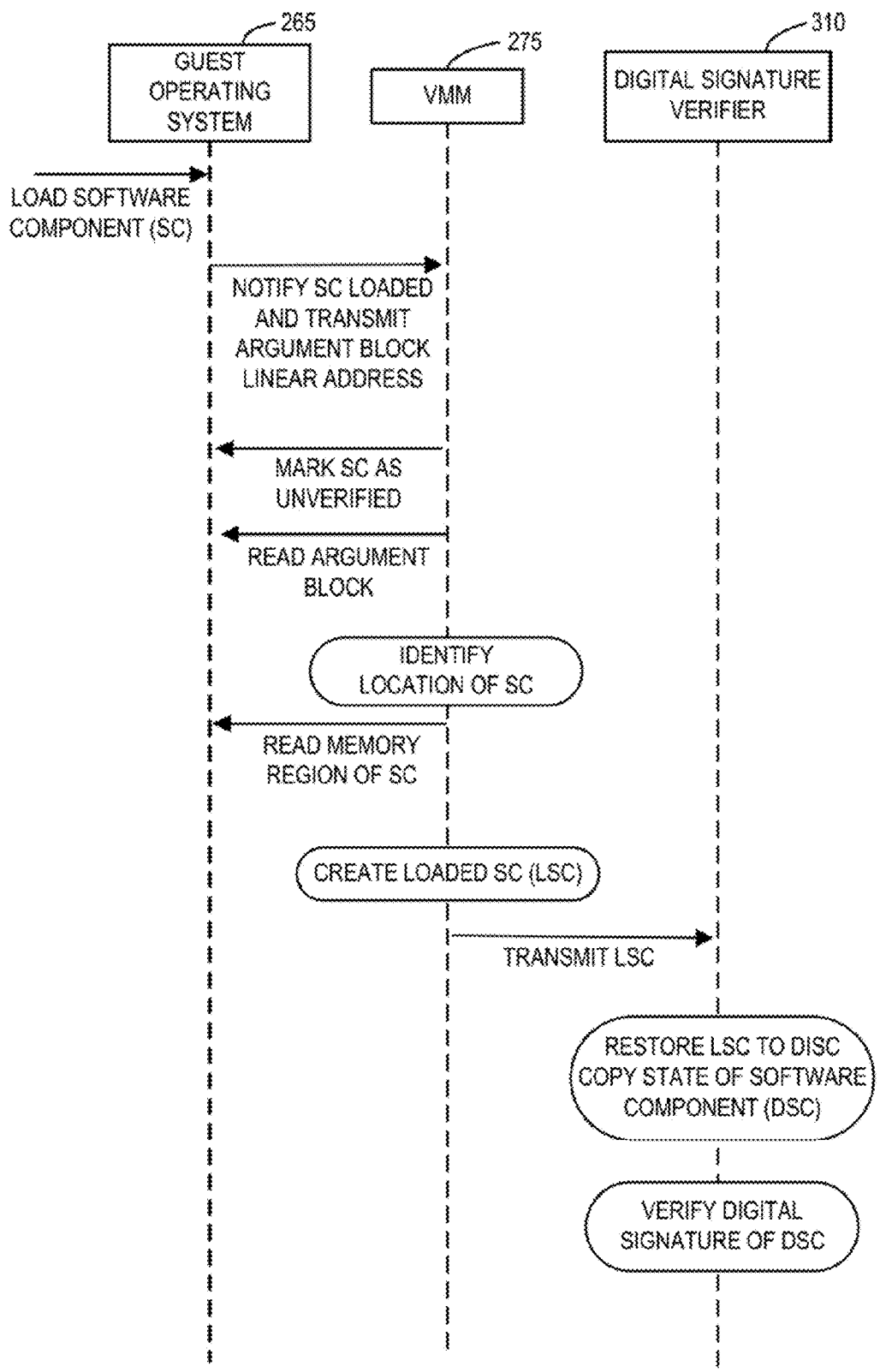
FIG. 3 is an exemplary sequence diagram of the operations performed by the guest operating system, the virtual machine monitor (VMM), and the digital signature verifier to verify a software component.

FIG. 3 is an exemplary sequence diagram illustrating the interaction between the guest operating system running on the VM, the VMM, and the digital signature verifier during host or hypervisor based verification of a digital signature. The operations illustrated in the sequence of FIG. 3 are described in more detail in the detailed description of subsequent figures.

Initially, the GOS 265 operating on the VM 235 loads a software component 402 from the software component's 402 disk. The GOS 265, in some examples using the digital signature verification proxy 410, makes a hypercall notifying the VMM 275 that a SC 402 has been loaded. The hypercall includes the argument block linear address and length of the loaded SC 402. In response, the VMM 275 marks the SC 402 as unverified and reads the argument block linear address. In some examples an SC 402 is automatically marked as unverified when it is loaded. An SC 402 is unverified when the GOS 265 has not yet verified the publisher of the SC 402, and that the SC 402 has not been tampered with. Reading the argument block linear address provides the VMM 275 with the load address of the SC 402 and the size of the SC 402. The VMM 275 reads the location of the SC 402, until it has read the entire length of the SC 402 from that location. After completely reading the SC 402 and the signature from the GOS 265, the VMM 275 creates a copy of the loaded SC 402 (abbreviated in the Figures as "LSC").

The VMM 275 furnishes the loaded SC 402 to the digital signature verifier 310. As will be described in further detail below, the digital signature verifier 310, working backwards from the loaded SC 402, undoes all of the changes made by the GOS 265 to create the loaded SC 402. As part of this process, in some examples, the starting address and length of the loaded copy of the SC 402 and the digital signature are passed in an argument block. The digital signature verifier 310 reads the guest memory occupied by the loaded copy of the SC 402 and the digital signature and generates the disk copy, which includes the digital signature. The result is that the loaded SC 402 is restored to its original disk copy state of the SC 402 (abbreviated as DSC in the Figures) in order to allow the digital signature verifier 310 to read the digital signature from the original disk copy state of the SC 402, since the loaded copy of the SC 402 does not include the digital signature. That is, the digital signature verifier 310 reads the LSC, and reads the signature using information specified in the argument block. Relocations are de-applied and resolutions are imported, along with other state changes on the LSC, to combine with the signature and generated the DSC.

The digital signature verifier 310 then computes the hash of the executable of the SC 402. In some examples, this computed has is referred to as the discovered digital signature, or the first digital signature. The digital signature verifier 310 also decrypts the hash stored in the digital signature using, the public key of the SC 402 publisher. The decrypted hash, in some examples, is referred to as the known digital signature, or the second digital signature. The public key of the SC 402 is, in some examples, extracted from the digital signature. After computing the hash of the executable and decrypting the hash stored in the digital signature, the digital signature verifier 310 compares the hash of the digital signature of the disk copy state of the SC 402 to the known digital signature of the publisher, to confirm that the disk copy state of the SC 402 is authentic, and that it has not been tampered with. That is, the hash is computed in the same way that it would have been computed previously, and then it is compared with the decrypted hash. The result of this comparison is transmitted back to the GOS 265 in some examples, but other examples contemplate no notification being sent to the GOS 265. The SC 402 is, in some examples, marked or flagged with the results of the comparison. Possible results include that the digital signature is verified as authentic, verified as not authentic, or that the verification was performed but the authenticity is "not known". In some examples, the results are 'dirty' or 'clean', 'trusted' or 'untrusted', 'valid' or 'invalid', or any other result description which indicates that the digital signature of the publisher and the integrity of the SC 402 was evaluated by the digital signature verifier 310.

Figure 4:
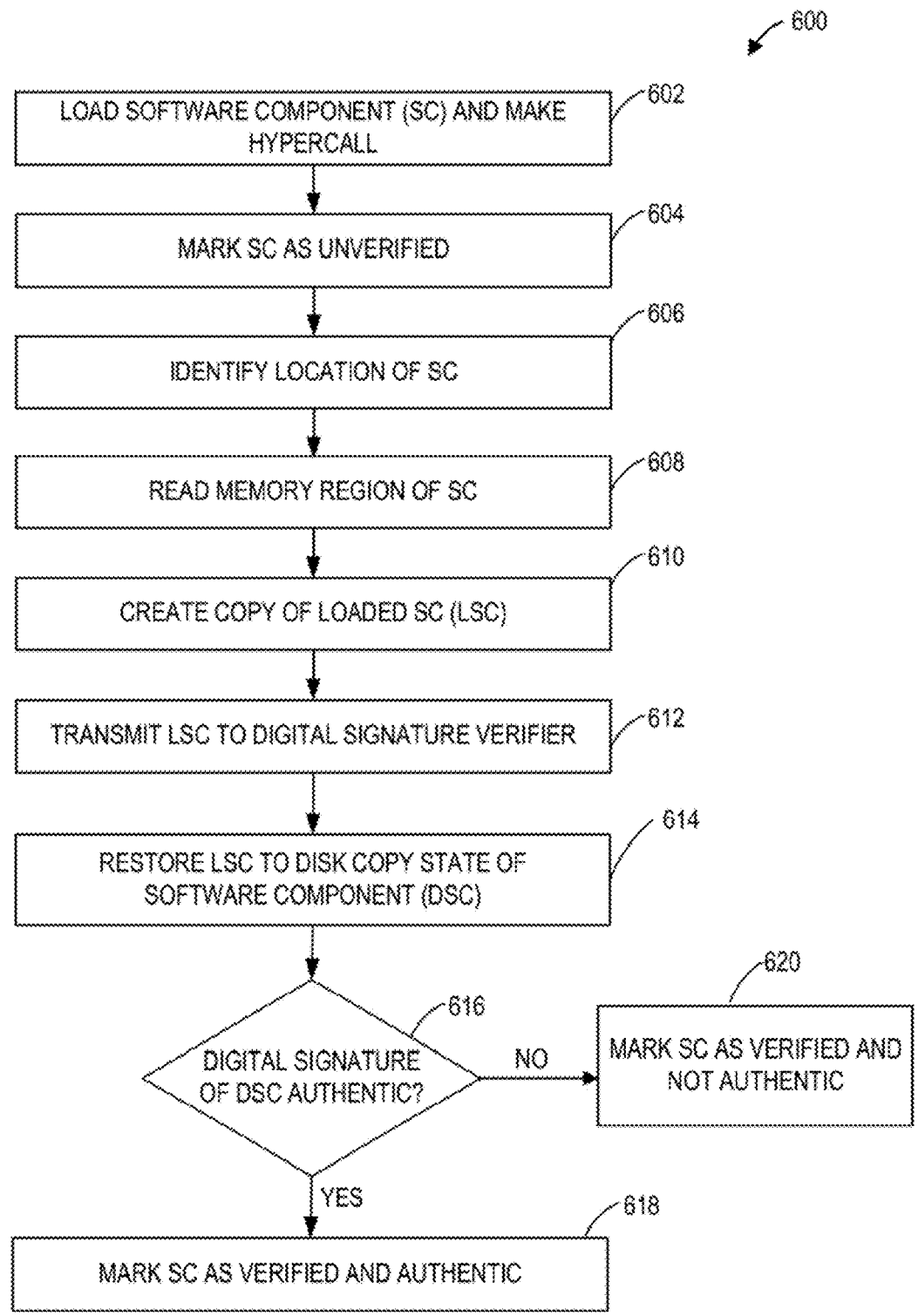
FIG. 4 is a block diagram of a flowchart of an example of the operations performed to verify a software component loaded by the GOS.

FIG. 4 is a block diagram of a flowchart of an example of the operations performed to verify a software component loaded by the GOS. The operations performed in FIG. 4 may be carried out by various components; however the hypervisor 210, or a processor, coordinates the operations between any components executing them. At 602, the GOS 265 operating on the VM 235 loads one of SCs 402 The SC 402 initiates signature verification before it modifies any global state variables. In some examples, the SC 402 has been loaded previously, and previously verified and authenticated. In this example, the method illustrated in FIG. 4 is performed again to ensure that the SC 402 has not been tampered with since it was last loaded. In other examples, the SC 402 has never been loaded by the GOS 265 before.

In some examples, the loaded SC 402 does not have the signature mapped. In such examples, the loaded SC 402 reads the signature back from the disk and passes the (start, length) of the loaded SC 402 and the signature block in the argument block.

When the GOS 265 loads the SC 402 it makes a hypercall to the VMM 275 which in some examples is operated by the hypervisor 210. The hypercall includes information about the loaded SC 402 in an argument block. The information passed to the VMM 275 includes the start address where the SC 402 is loaded, the size of the SC (excluding the digital signature), the start address of the digital signature, the size of the digital signature, and any other information which may be required by the digital signature verifier 310. The VMM 275 utilizes this information to read the loaded state of the SC 402.

In response to receiving the hypercall from the GOS 265 the VMM 275 marks the SC 402 as unverified at 604. In some examples the SC 402 is marked as unverified upon loading. The GOS 265 does not make any global changes or effect any other GOSs 265 or VMs 235 while awaiting verification. The SC 402 is not permitted to operate in an unverified state. At 606, the VMM 275 identifies the location of the SC 402. The VMM 275 reads this information from the argument block linear address provided by the GOS 265. The information read at the argument block linear address includes any relevant information about the SC 402, including the size and address of the SC 402.

In some examples, the signature block is not mapped in the address space of the loaded SC 402. In these examples, the SC 402 reads the signature block and passes the (start, length) of the loaded SC 402 and signature block. The digital signature verifier arrives at the DSC using the loaded SC 402 and the signature block.

Figure 6:
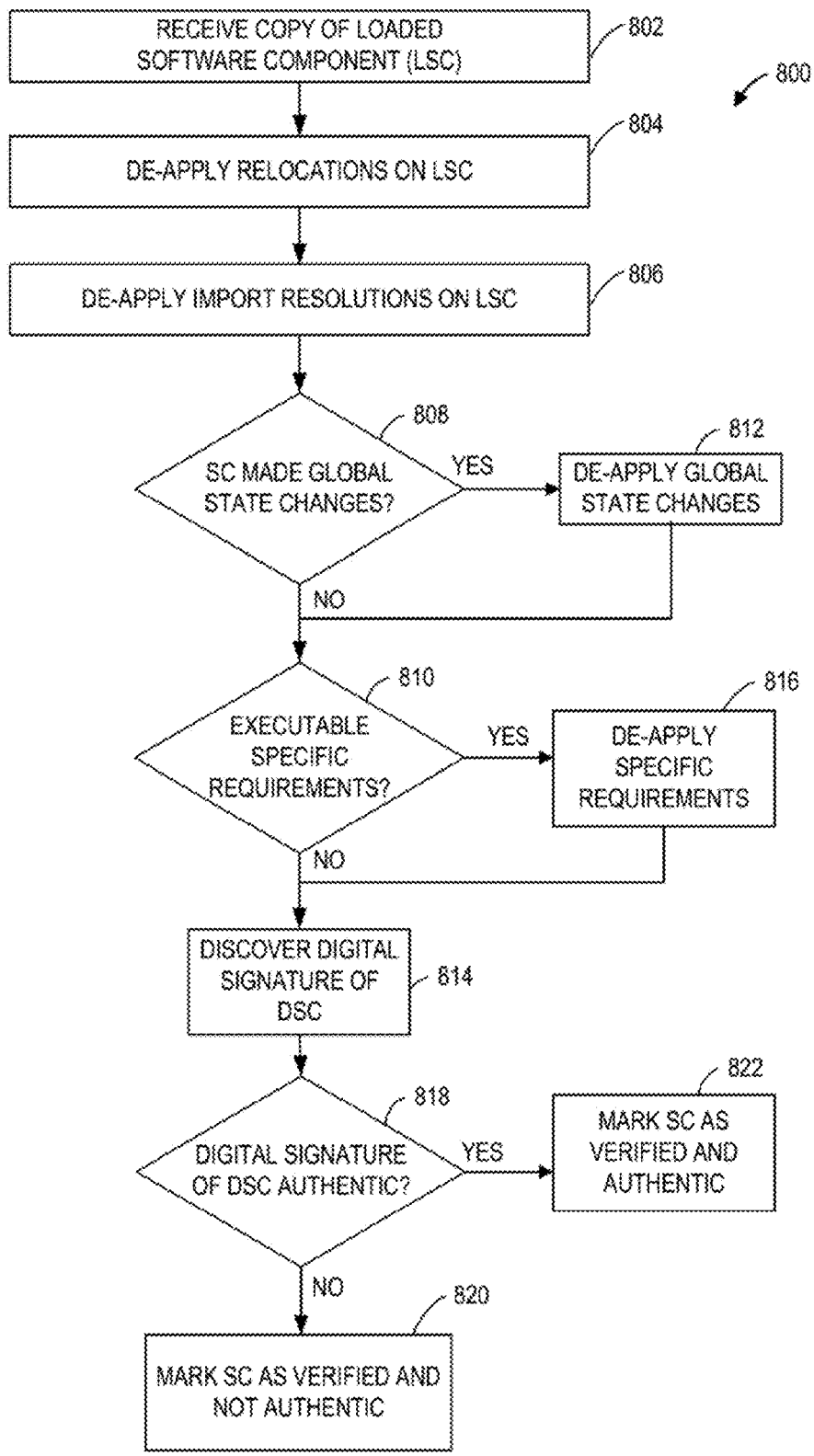
FIG. 6 is a block diagram of a flowchart of an example of the operations performed by a digital signature verifier to verify a software component loaded by the GOS.

Once the memory region of the SC 402 has been fully read, the VMM 275 creates a copy of the loaded SC 402 (referred to as LSC in the figures) at 610. The copy created by the VMM 275 from the read content duplicates the SC 402 as it exists on the GOS 265. The VM 275 transmits the copy of the loaded SC 402 to the digital signature verifier 310 at 612. At 614, after receiving the copy of the loaded SC 402 the digital signature verifier 310 restores it to the disk copy state of the SC 402. The operations performed by the digital signature verifier 310 to restore the copy of the loaded SC 402 to its disk copy state (referred to in the Figures as "DSC") are illustrated in FIG. 6 and described in the detailed description of FIG. 6.

When the software component was created, a hash of the program binary bits was taken and encrypted with a private key of the publisher of the SC 402 to make the digital signature. The digital signature verifier 310 partially recreates this step by computing the hash of the executable it reads from the disk copy state of the SC 402 (in some examples referred to as the discovered digital signature, or first digital signature). The digital signature verifier 310 also uses a public key to decrypt the digital signature on the disk copy state of the SC 402, to get a second hash (in some examples referred to as the known digital signature, or second digital signature). The digital signature verifier 310 compares the computed hash to the decrypted hash at 616. In some examples, for instance in WINDOWS brand operating systems, the digital signature is not part of the loaded SC 402. Instead, in that example, the digital signature needs to be read explicitly by the software component and its memory location is reported as part of the argument block. In some examples, the digital signature verifier 310 compares tokens, hashes, bits, or any other identifying information known in the art to verify the authenticity of the SC 402. For example, the digital signature verifier 310 may compute the hash of the executable using the algorithm for hashing stored in the signature block, and decrypt the hash stored in the signature block using the public key of the publisher, and match the decrypted hash with the computed hash. The public key, in that example, is available in the certificate that is part of the signature.

If the two hashes, also described as the discovered digital signature and the known digital signature, match, the SC is marked as verified by the digital signature verifier 310, and the verification is that the digital signature and thus the SC 402 are authentic at 618. However, if the discovered digital signature and the known digital signature do not match, then although the SC 402 has been verified by the digital signature verifier 310, it is marked as not authentic at 620. In some examples, the digital signature verifier 310 is unable to authenticate the digital signature, and the SC 402 is marked as verified but unknown. For example, the known digital signature may be unavailable, or the discovered digital signature may be corrupted.

In this example, all SCs 402 which have been examined by the digital signature verifier 310 are marked as verified so that they are not inadvertently sent through the process again. However, if the discovered digital signature does not match the known digital signature of the publisher, the SC 402 is marked as not authentic so that the GOS 265 or the host computing device 100 or hypervisor 210 may take appropriate actions. In some examples, the GOS 265, host computing device 100, hypervisor 210, user 108, or administrator removes the SC 402, quarantines the GOS 265, permanently locks the GOS, or takes other action in response to a verification that the SC 402 is not authentic.

While the outcome of these operations is described in terms of verification and authenticity, any other descriptive terms are interchangeable. For example, SCs 402 may be described as invalid or valid, clean or dirty, known or unknown, safe or unsafe, trusted or untrusted, or any other descriptive taxonomy.

Figure 5:
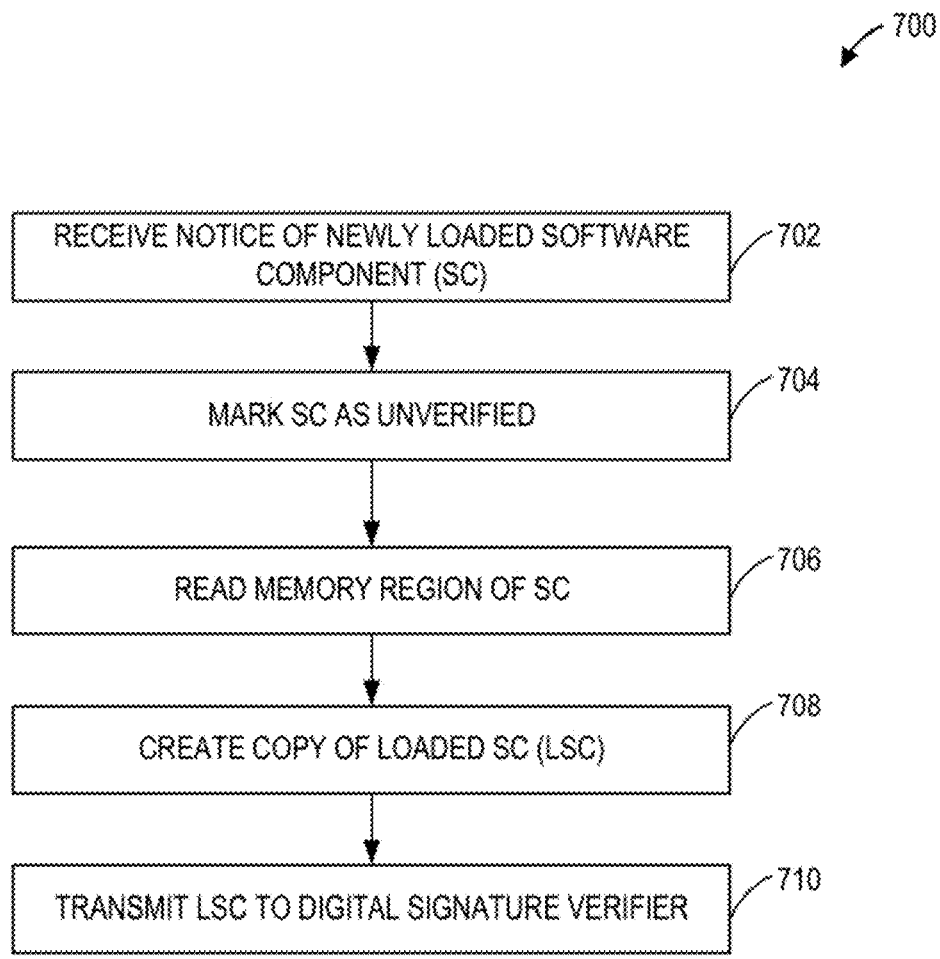
FIG. 5 is a block diagram of a flowchart of an example of the operations performed by a VMM to verify a software component loaded by the GOS.

FIG. 5 is a block diagram of a flowchart of an example of the operations performed by VMM 275 to verify a software component (SC) 402 loaded by the GOS 265. At 702 the GOS 265 notifies the VMM 275 that a SC 402 has been loaded on the GOS 265. The notification to the VMM 275 is, in some examples, a hypercall. The hypercall to the VMM 275 from the GOS 265 includes the argument block linear address of the newly loaded SC 402, and the length of the argument block linear address. The argument block contains information about the SC 402. For example, the argument block may include the size of the loaded SC 402, and the address or location of the loaded SC 402.

At 704 the VMM 275 marks the SC 402 as unverified. In some examples an unverified SC 402 is prohibited from making any changes to global variables, the VM 235 running the GOS 265 which loaded the unverified SC 402 is quarantined, the GOS 265 is locked, or the unverified SC 402 and its associated VM 235 and GOS 265 are otherwise prevented from affecting other components of the system. In some examples the host computing device 100 or hypervisor 210 implements policies regarding unverified SCs 402.

At 706 the VMM 275 reads the memory region of the GOS 265 containing the loaded SC 402. in some examples the VMM 275 iteratively reads the memory region until the entire loaded SC 402 is read. After the entire loaded SC 402 is read, the VMM 275 creates a copy of the loaded SC 402 (referred to as LSC in the Figures) at 708. In some examples the VMM 275 begins to create a copy of the loaded SC 402 while still reading the memory region where the loaded SC 402 is located. After creating the copy of the loaded SC 402, the VMM 275 transits the copy of the loaded SC 402 to the digital signature verifier 310 at 710.

FIG. 6 is a block diagram of a flowchart of an example of the operations performed by a digital signature verifier 310 to verify at least one of SCs 402 loaded by the GOS 265. At 802 the digital signature verifier 310 receives a copy of the loaded SC (referred to as "LSC" in the figures) 402 from the VMM 275. In some examples the VMM 275 created the loaded SC 402 on request of the digital signature verifier 310. The digital signature verifier 310 then begins to work backwards, performing the steps the GOS 265 did to load the SC 402 in reverse on the copy of the loaded SC 402 to return it to a disk copy state.

First, the digital signature verifier de-applies any relocations on the copy of the loaded SC 402 at 804. This returns the copy of the loaded SC 402 to its position before the GOS 265 relocated it at the conclusion of loading it. At 806 the digital signature verifier 310 de-applies on the copy of the loaded SC 402 any import resolutions that the GOS 265 performed on the SC 402. If any global state changes were made when the SC was installed, the digital signature verifier de-applies those global state changes at 812. The digital signature verifier 310 evaluates the copy of the loaded SC for any requirements specific to its executable type at 810. For instance, if any operations were performed to load the SC 402, those operations would be reversed based on the type of executable at 816. In some examples the GOS 265 performed additional operations in loading the SC which are not illustrated in FIG. 6. Those operations are also reversed to reach a disk state copy of the loaded SC 402.

At 814, after the digital signature verifier 310 has reversed all the operations performed by the GOS 265 on the copy of the loaded SC 402, the digital signature verifier 310 discovers the digital signature of the disk state copy of the loaded SC 402. Discovering the digital signature, in some example, includes the loaded SC 402 reading the signature block from the disk and informing where in memory the loaded SC 402 and the signature block are accessible. The digital signature verifier computes the hash (e.g., H1) in the same way the hash would have been computed previously (e.g., by a signing tool). The hash (e.g., H2) stored in the signature is then decrypted using the public key of the publisher of the SC 402 which is also available in the signature block. The digital signature verifier 310 compares the discovered digital signature (e.g.,) with the known digital signature (e.g., H2). If the discovered digital signature and the known digital signature (e.g., the two hashes) match, the SC 402 is marked as verified and authentic at 822. If the discovered digital signature and the known digital signature do not match, the SC 402 is marked as verified and not authentic. Marking the SC 402, in some examples, includes notifying the GOS 265, or other components, of the result of the digital signature verification. In some examples, the known digital signature of the publisher of the software component is stored by the host computing device 100 and accessed by the digital signature verifier 310. In other examples, the digital signature verifier 310 requests, from the publisher of the SC 402, the known digital signature of the publisher.

Figure 7:
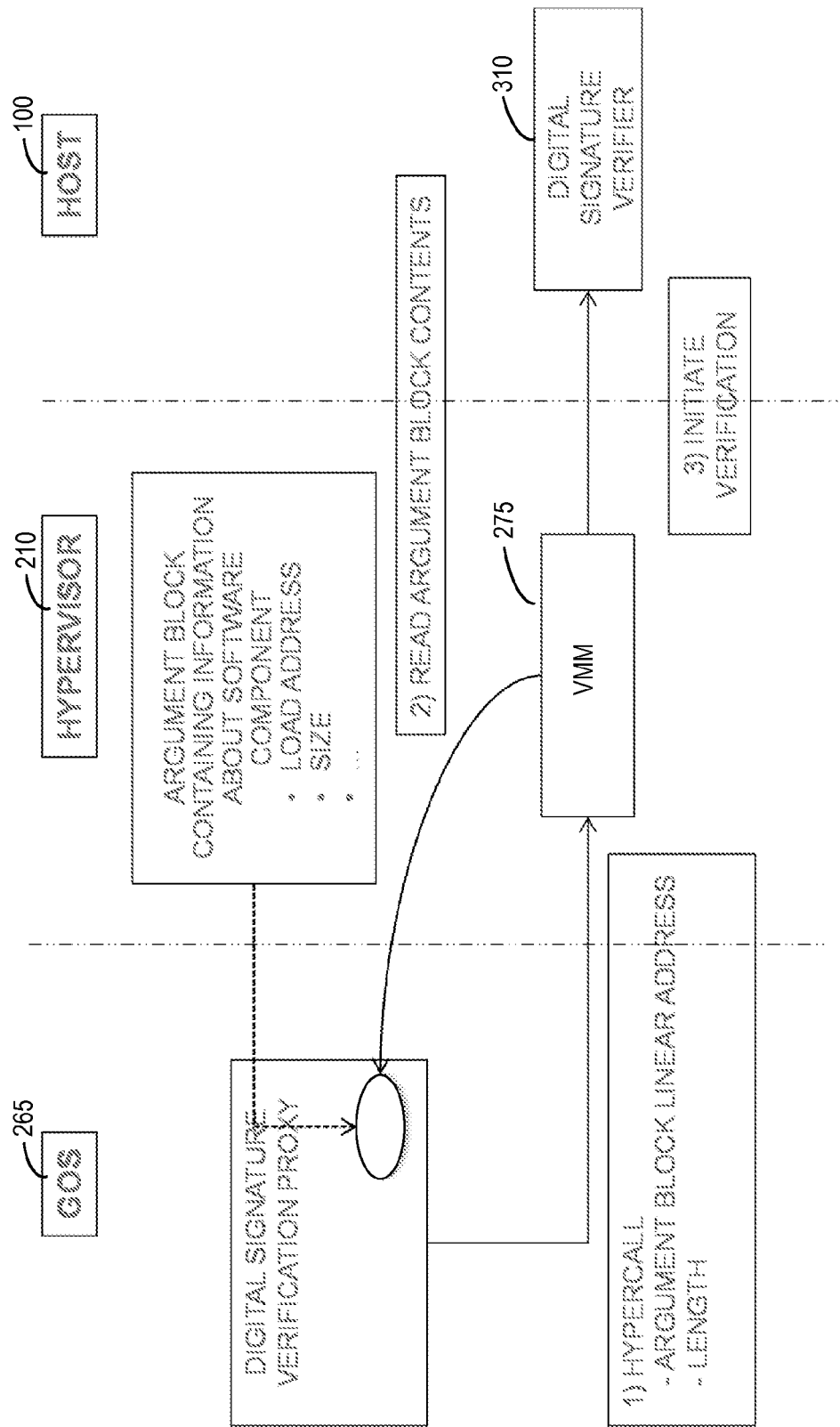
FIG. 7 is a block diagram of an example of the operations for initiating digital signature verification.

FIG. 7 is a block diagram of one example of the operations for initiating digital signature verification by a host or hypervisor. In the example of FIG. 7, the GOS 265 initiates a hypercall to the VMM 275. The hypercall includes the argument block linear address of the SC 402 and its length. In the example of FIG. 7, the VMM 275 reads the argument block contents from the GOS 265. The argument block contents may include various information about the loaded SC 402. In this example, the argument block includes the load address of the SC 402, the size of the loaded content, the start address of the digital signature, the size of the digital signature, and any other information required by the digital signature verifier 310. In one example, illustrated in FIG. 7, a kernel driver identified as the digital signature verification proxy 410, acts as a proxy to the host based digital signature verification after verifying itself. In some examples, all other software components then call into the digital signature verification proxy 410 to do host based digital signature verification. In this example, all verification is conducted through a verified and authenticated digital signature verification proxy 410.

The VMM 275 also initiates the digital signature verification by contacting the digital signature verifier 310. In the example illustrated in FIG. 7, the VMM 275 is located on the hypervisor 210, while the digital signature verifier 310 is located on the host computing device 100. In some examples both the VMM 275 and the digital signature verifier are located on the hypervisor 210. In other examples, both the VMM 275 and the digital signature verifier 310 are located on the host computing device 100. The location of the VMM 275 and the digital signature verifier 310 may vary, however they must always be outside of the GOS 265 and the VM 265 in order to provide more reliable digital signature verification with less opportunity for corruption.

Figure 8:
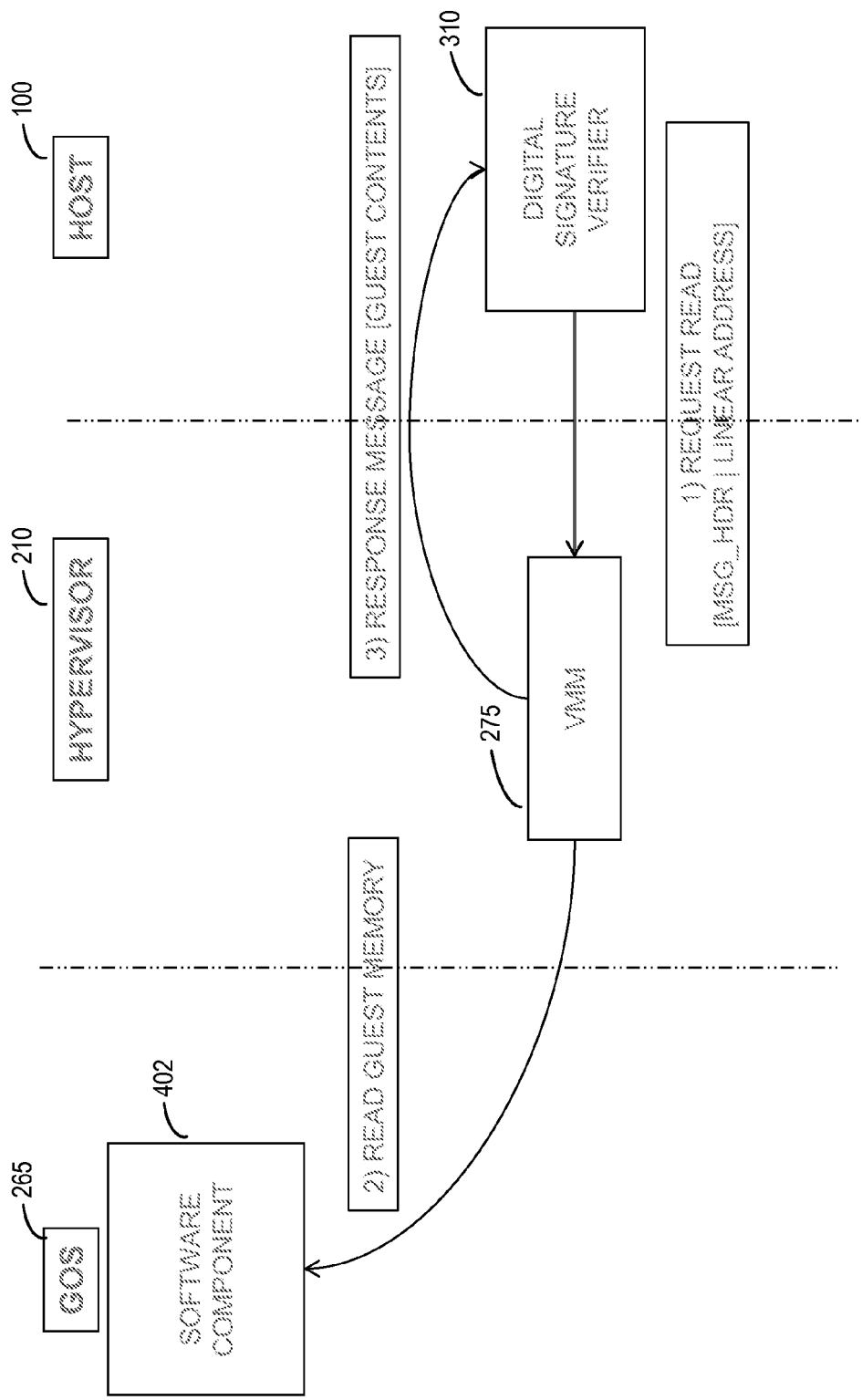
FIG. 8 is a block diagram of an example of the operations for reading the loaded software component and transmitting it to the digital signature verifier.

FIG. 8 is a block diagram of an example of the operations for reading the loaded SC 402 and transmitting it to the digital signature verifier 310. In the example of FIG. 8, the digital signature verifier 310, after receiving a request for digital signature verification, requests that the VMM 275 read the loaded SC 402 from the GOS 265. In response, the VMM reads the memory of the SOS 265 at the appropriate location. Since the VMM 275 was notified of the location of the SC 402, and its size, when it read the argument block linear address, the VMM 275 is able to read the location of the SC 402 until it has fully read the loaded SC 402. After reading the loaded SC 402, the VMM 275 transmits the copy of the loaded SC to the digital signature verifier 310. In this example, as in FIG. 7, the VMM 275 is located on the hypervisor 210, and the digital signature verifier 310 is located on the host computing device 100. In other examples, other configurations are possible as long as the VMM 275 and the digital signature verifier 310 remain external to the SOS 265 and the VM 235.

Figure 9:
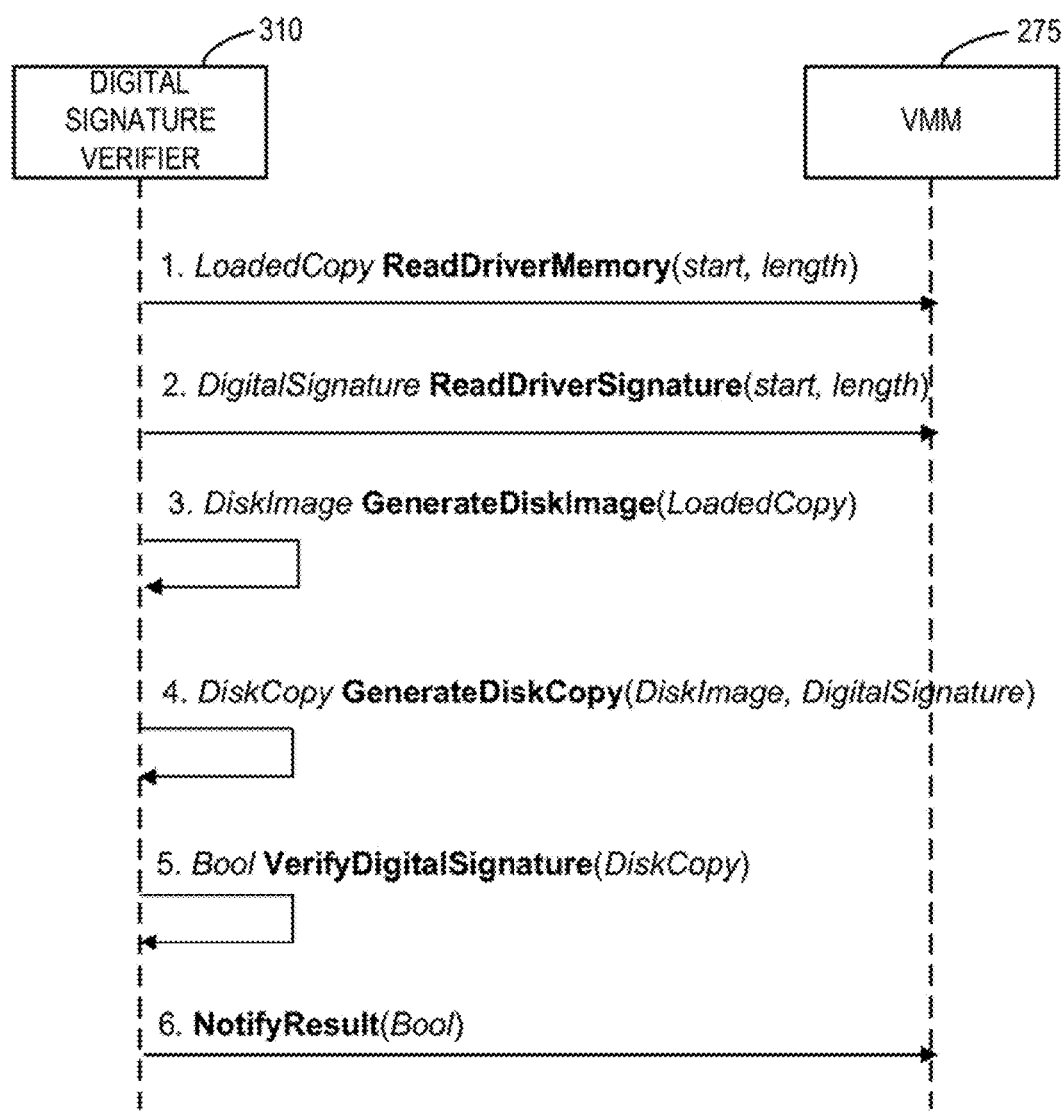
FIG. 9 is an exemplary sequence of application programming interfaces (APIs) utilized in executing the verification of a digital signature of a software component.

FIG. 9 is an exemplary sequence of APIs invoked by the VMM 275 and the digital signature verifier 310 in executing the verification of a digital signature of SC 402. The operations performed by the APIs described in the detailed description of FIG. 9 are described in more detail in the detailed descriptions of FIGS. 6, 7, and 8. These APIs are examples, and other APIs known in the art may be substituted.

The digital signature verifier 310 invokes an API (e.g., ReadDriverMemory( )) that reads the copy of the loaded SC 402 from the VMM 275. The digital signature verifier 310 invokes a second API (e.g., ReadDriverSignature( )) which requests the digital signature of the loaded SC 402 from the VMM 275. Once the digital signature verifier 310 has the entire copy of the loaded SC 402, the digital signature verifier 310 invokes any API (e.g., GenerateDiskImage( )) to create a disk state copy of the copy of the loaded SC 402. The digital signature verifier 310 then invokes an API (e.g., VerifyDigitalSignature( )) to compare the discovered digital signature with the known digital signature, and further invokes an API (e.g., NotifyResult( )) to notify other elements, for instance the GOS 265 of the results of the comparison.

ADDITIONAL EXAMPLES

The following scenarios are merely exemplary and not intended to be limiting in any way.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In the foregoing examples, VMs are used as an example for the containers and hypervisors as an example for the hardware abstraction layer. Each VM generally includes a guest operating system in which at least one application runs. It should be noted that these examples may also apply to other examples of containers, such as containers not including a guest operating, system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

In one example, traces are installed on all memory blocks of the SC 402 while performing verification. The traces are marked as read-only. If at attempt is made to modify the in-memory blocks the hypervisor is notified. Such notification may include marking the SC 402 as unverified, again, requiring that the digital signature verification is performed, or implementing a quarantine or locking policy.

In another example, policies exist for implementation depending on the result of the digital signature verification. For instance, the hypervisor may have a policy requiring quarantine of any SC 402 marked as not authentic after digital signature verification.

Exemplary Operating Environment

Figure 10:
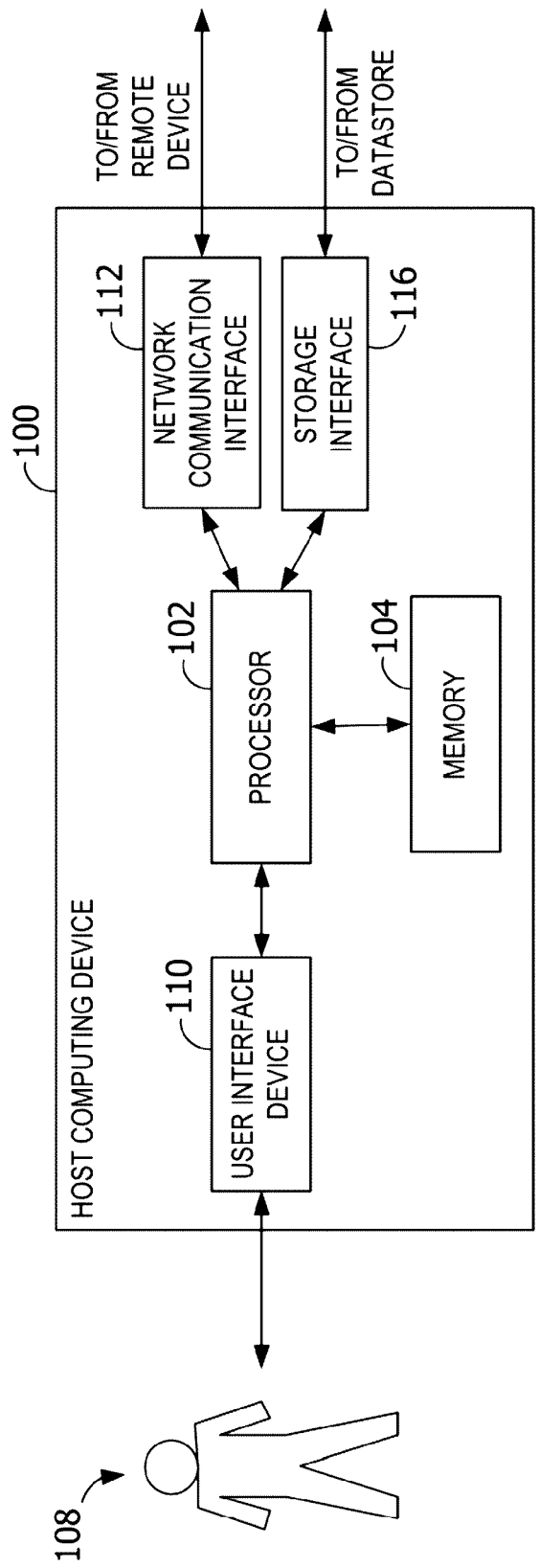
FIG. 10 is a block diagram of an exemplary host computing device.

FIG. 10 is a block diagram of an exemplary host computing device 100. Host computing device 100 includes a processor 102 for executing instructions. In some examples, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108. In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/of an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In some examples, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 11:
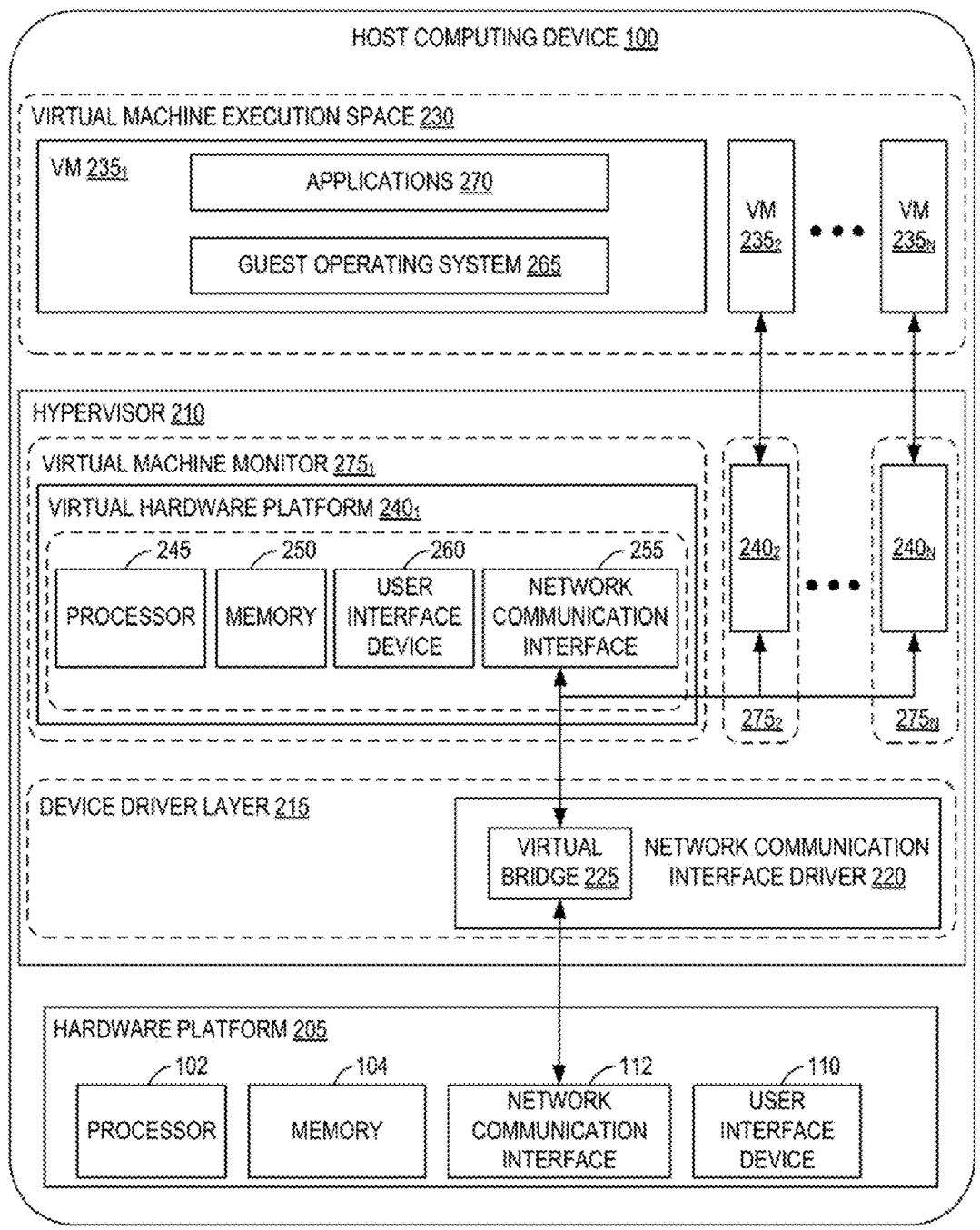
FIG. 11 is a block diagram of virtual machines that are instantiated on a computing device, such as the host computing device shown in FIG. 10.

FIG. 11 depicts a block diagram of virtual machines $235_1$, $235_2 \ldots 235_N$ that are instantiated on host computing device 100. A virtual machine 235 is, in some examples, a software computer that, like a physical computer, runs an operating system and applications. In some examples the virtual machine is created from a set of specification and configuration files and is backed by the physical resources of a host. Virtual machines 235 include virtual devices that provide the same functionality as physical hardware and have additional benefits in terms of portability manageability, and security.

Host computing device 100 includes a hardware platform 205, such as an x86 architecture platform. Hardware platform 205 may include processor 102, memory 104, network communication interface 112, user interface device 110, and other input/output (I/O) devices, such as a presentation device (not shown). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may he concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that Vis $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some examples, memory 250 in first virtual hardware platform $240_1$ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an example, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers and categorizations used to describe the virtualization components in FIG. 11 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an example of the disclosure is included as a component in VMware's ESX brand software, which is commercially available from VMware, Inc.

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may he organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the disclosure constitute exemplary means for verifying, by a host or hypervisor, the digital signature of a software component operating on a guest operating system. Verification of the software component by an element external to the VM, for instance the host or hypervisor, increases the validity of the verification. Some examples contemplate creating a disk state copy of the software component by reversing any changes made in loading the software component. The digital signature of the disk state copy of the software component may then be verified by comparing it to a known digital signature of the publisher of the software component.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing, or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising" "including" and "having" are intended to be inclusive and mean that there may be additional elements other than the listed elements. The term "exemplary" is intended to mean "an example of".

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for verifying integrity and authenticity of a software component loaded on a data compute node, said system comprising:
    a memory area associated with a computing device, said memory area storing a data compute node; and
    a processor external to the data compute node programmed to:

in response to receiving a notification that a software component is loaded on the data compute node, read a copy of the loaded software component;

restore the read copy of the loaded software component to a disk copy state;

verify authenticity of first digital signature of the restored disk copy state of the software component by comparing it to a second digital signature; and notify the data compute node of the authenticity of the software component.

2. The system of claim 1, wherein a first digital signature utilizes a first hash of an executable of the software component.

3. The system of claim 1, wherein a public key is used to decrypt a second hash to find a second digital signature of a software component.

4. The system of claim 1, wherein the processor is further programmed to transmit the disk copy state of the software component to the digital signature verifier.

5. The system of claim 1, wherein the verified digital signature of a publisher is stored outside the data compute node.

6. The system of claim 1, further comprising means for marking the software component as at least one of verified, unverified, authentic, not authentic, or unknown.

7. The system of claim 6, wherein the data compute node is a virtual machine or a container.

8. A method comprising:
in response to receiving a notification that a software component which is not verified is loaded on a data compute mode operating on a host, reading a loaded copy of the software component from the data compute node;

restoring the loaded copy of the software component to a disk copy state; and comparing a first digital signature of the disk copy state of the software component to a second digital signature of a publisher of the software component; and notifying the data compute node of a result of the comparison of the first digital signature to the second digital signature.

9. The method of claim 8, further comprising receiving the notification that the software component which is not verified is loaded on the data compute node operating on the host.

10. The method of claim 8, further comprising computing a first digital signature by calculating a first hash of an executable of the software component.

11. The method of claim 8, wherein restoring the loaded copy of the software component to the disk copy state comprises undoing a plurality of changes made to load the software component.

12. The method of claim 8, wherein the result of the comparison of the first digital signature to the second digital signature is at least one of authentic, not authentic, or unknown.

13. The method of claim 8, further comprising marking the software component as verified based on the result of the comparison.

14. The method of claim 8, wherein restoring the loaded software component to the disk copy state further comprises at least one of de-applying one or more relocations, de-applying one or more import resolutions, de-applying one or more global state changes, or de-applying one or more executable requirements.

15. The method of claim 8, further comprising decrypting a second hash from a second digital signature of the software component using a public key.

16. A non-transitory computer readable storage medium having stored thereon computer software executable by a processor, the computer software embodying a method for verifying the authenticity of a software component by:
receiving a notification that a data compute node has loaded the software component, wherein the loaded software component is unverified;

reading, in response to the received notification, the loaded software component from the data compute node;

restoring the loaded software component to a disk copy state;

comparing a first digital signature of the disk copy state of the software component to a second digital signature of a publisher of the software component; and notifying the data compute node of a result of the comparison of the second digital signature to the first digital signature, wherein the software component is prevented from making global changes or executing until the second digital signature is verified as authentic.

17. The non-transitory computer readable storage medium of claim 16, wherein the computer-executable instructions further cause the processor to read a location of the software component iteratively until all the software component are read.

18. The non-transitory computer readable storage medium of claim 16, wherein the computer-executable instructions further cause the processor to lock the data compute node until the software component is authenticated.

19. The non-transitory computer readable storage medium of claim 16, wherein the computer-executable instructions cause the processor to mark the software component as verified or unverified when the software component is loaded on the data compute node.

20. The non-transitory computer readable storage medium of claim 19, wherein the computer-executable instructions cause the processor to mark the software component as verified after authentication.

* * * * *